No. 655,686. Patented Aug. 14, 1900.
D. C. CAWLEY.
TRACTION ENGINE.
(Application filed Dec. 15, 1899.)
(No Model.) 2 Sheets—Sheet 2.
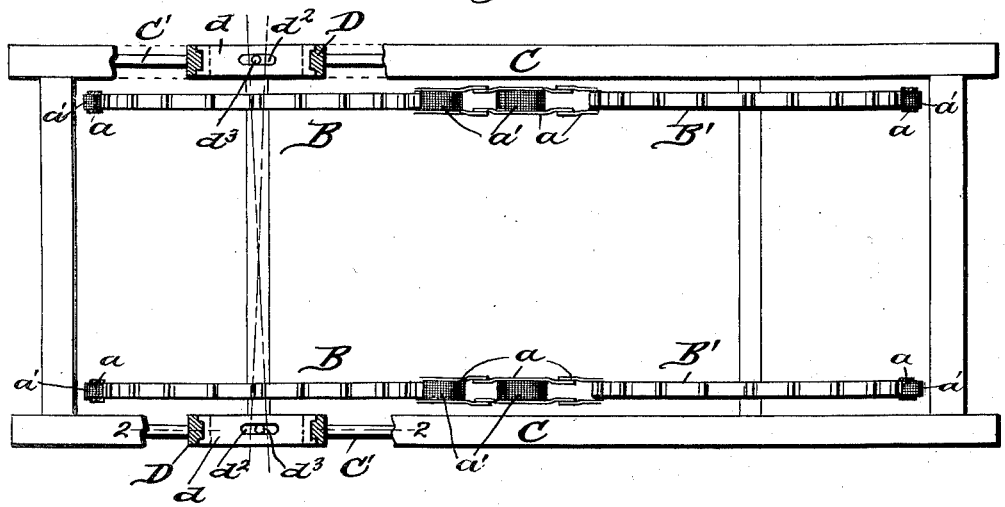
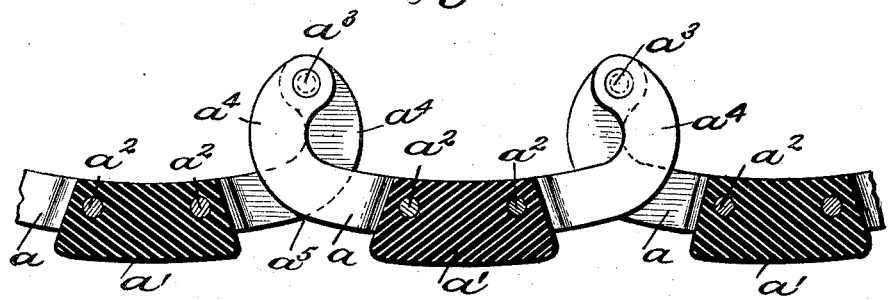
WITNESSES:
M. Bloudel
Edw. W. Byrn.
INVENTOR
D. C. Cawley.
BY Munn & Co.
ATTORNEYS

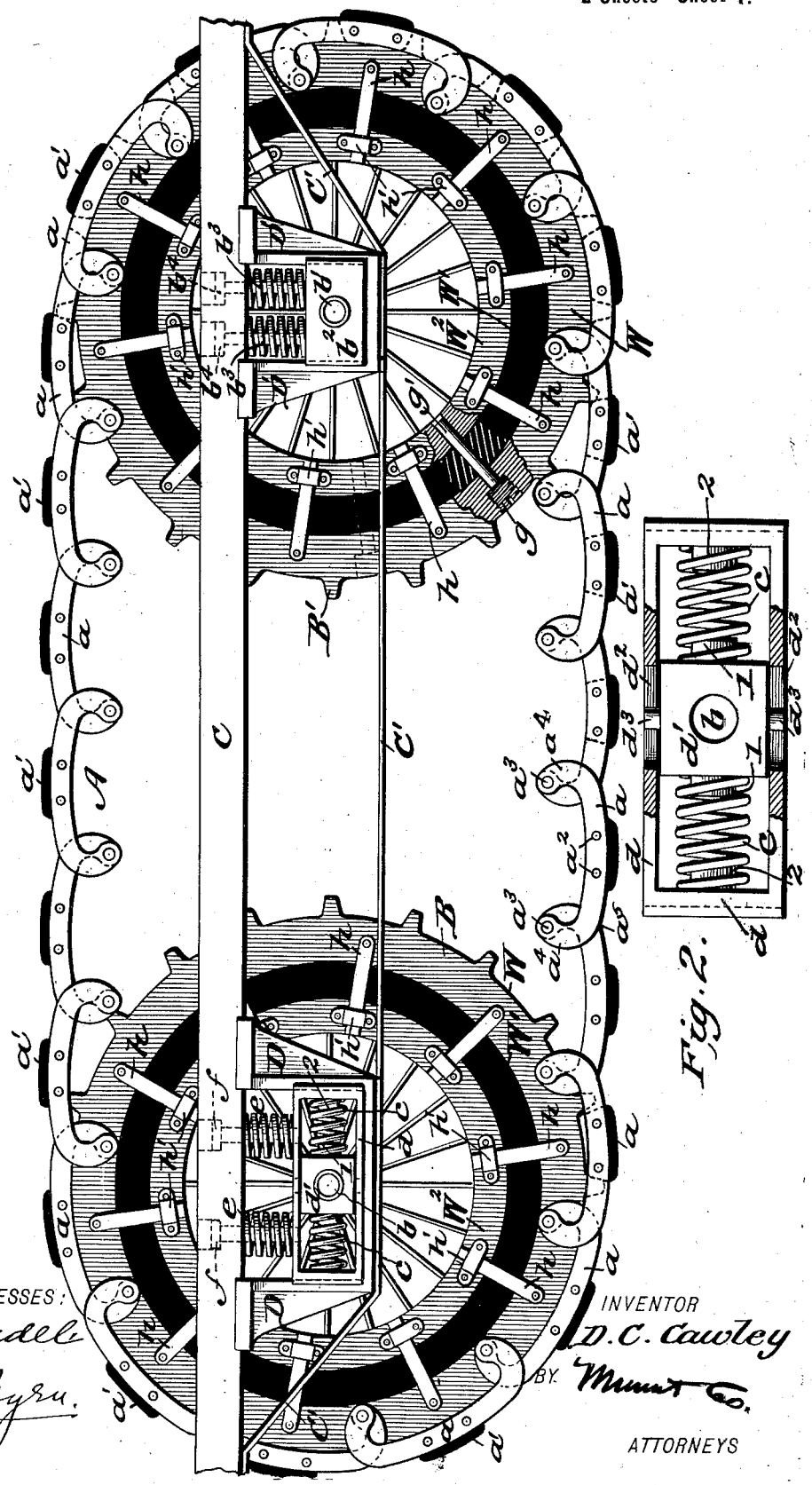

UNITED STATES PATENT OFFICE.

DANIEL CHARLES CAWLEY, OF ALLEGHENY, PENNSYLVANIA.

TRACTION-ENGINE.

SPECIFICATION forming part of Letters Patent No. 655,686, dated August 14, 1900.

Application filed December 15, 1899. Serial No. 740,480. (No model.)

*To all whom it may concern:*

Be it known that I, DANIEL CHARLES CAWLEY, of Allegheny, in the county of Allegheny and State of Pennsylvania, have invented a new and useful Improvement in Traction-Engine Trucks, of which the following is a specification.

The object of my invention is to provide a construction of truck for traction-engines, and more particularly that form of traction-engines known as "automobiles" and specially designed for heavy hauling.

The primary object is to secure a greater bearing and tractive effect on the ground, it being well known that sandy, muddy, and rough roads present great obstacles to the successful use of motor-wagons.

My invention employs the principle of the endless track-chain revolving around the truck-wheels and bearing directly on the road-bed for greater frictional contact, and it provides means for accommodating the various adjustments which a rough road renders necessary with said track-chain.

It also consists in the construction and arrangement of the wheels, the chains, and the bearings, as hereinafter more fully described.

Figure 1 is a side view, partly in section, of one of my trucks. Fig. 2 is a sectional detail through line 2 2 of Fig. 3. Fig. 3 is a plan view, partly in section. Fig. 4 is an enlarged longitudinal section of one of the links of the chain, and Fig. 5 is a plan view of a number of the links connected up into a chain.

Referring to Fig. 1, A represents the endless track-chain, passing around the truck-wheels B B', which are constructed as sprocket-wheels. C C' represent the truck-frame, in which are arranged the hangers D D and D' D', in which slide the boxes that carry the axles of the wheels. The axle $b'$ of the wheels B' is journaled in the box $b^2$, which slides up and down within the hangers D' D' and has above it helical springs $b^3 b^3$, through which pass guide-rods $b^4 b^4$ to permit of elastic up-and-down movement of the trucks on the wheels after the ordinary construction of car-wheel boxes. The bearings for the front axle $b$ are, however, altogether different, as they have not only an up-and-down yielding movement, but a horizontal forward-and-backward yielding movement as well, which has a very important coaction with the track-chain A, as will be hereinafter described. The axle-journals $b$ of the wheels B are contained in bearings $d'$, which slide horizontally in elongated yokes $d$, and each bearing or box $d'$ has on each side of it a helical spring $c$, seated at its ends upon projections 1 and 2, formed, respectively, on the sides of the box $d'$ and the end sections of the yoke. Above the yoke $d$ are arranged springs $e\ e$ and guide-rods $f\ f$, which render the yoke and the horizontally-sliding box within it yielding in vertical direction between the hangers D D. The box $d'$ has on the top and bottom sides vertical pivot-lugs $d^3\ d^3$, Fig. 2, which pass through slots $d^2\ d^2$ in the yoke. These pivoted lugs guide the boxes $d'$ in their horizontal reciprocating movement and also form a vertical axis, which permits the angular relation of the wheel-axle $b$ to be changed from the right-angular position seen in Fig. 3 to a more or less oblique one, as shown in dotted lines.

I will now explain the peculiar coaction and value between the endless track-chains A and the horizontally-yielding boxes $d'$ of the front axle. If the front axle and the rear axle were always parallel and an invariable distance apart, it will be seen that if the chain A should run upon a stone or other projection above the road-bed it would produce a severely-damaging strain upon the chain and probably break it; but with the box $d'$ and axle $b$ adjustable against a spring tension any stone or projection which presses upwardly on the chain does not produce a damaging strain thereon, but merely pulls the box $d'$ to the rear sufficiently to accommodate the upward bend of the chain, and thus relieves it of strain. This, however, is not the only function of the horizontally-yielding boxes; but they are a necessary feature in turning, for they permit the axle to be thrown from a right-angular position to an oblique one, as shown by the dotted lines in Fig. 3, thus permitting the plane of the front wheels to be slightly changed, as is necessary in turning. It will be understood that the longitudinal lay of the track-chain on the ground would naturally have a tendency to cause the truck to always move forward in a straight line but for this provision. In this connection the necessity of the pivot-lugs $d^2\ d^2$ of the boxes $d'$ will be understood, as they permit this angular adjustment of the axle, as shown in Fig. 3.

In the construction of the chain A, I aim at three results. The first object is to prevent the joints of the chain from getting in the dirt, which would cause them to rapidly wear out. For this purpose their ends are turned up quite a distance from their middle bearing-surfaces, so as to elevate the articulated joints, as seen in Figs. 1 and 4. I also bend the ends of each pair of links inwardly toward each other, so that when coupled together with the next adjacent links the link ends lap past each other a considerable distance, which prevents any V-shaped angle between the links at $a^5$, Fig. 1, which in opening and closing would be liable to catch and retain any loose stones or other objects in the roadbed and which would cause binding and loss of power and possibly the breaking of the links. The locking-lugs of the chain, which form the grappling-points for the sprocket-teeth of the wheels, are made of blocks of rubber $a'$, secured by two bolts $a^2 a^2$. This not only renders the bearings elastic and free from rattling noise, but allows a slight yielding of the chain, which provides for turning and relieves the chain from damaging strains.

In constructing the wheels I make them in three principal parts—the outer ring W of metal on which the sprocket-teeth are formed, the inner ring $W^2$ of metal to which the hub and spokes are attached, and an intermediate ring $W'$ of soft rubber to produce a cushioned effect and to deaden the sound and reduce the rattle of the chain. These three sections of the wheel are bored with coinciding holes in radial direction, and a guide-pin $g'$ is fixed in the outer ring by an enlarged screw-threaded end $g$. These pins are arranged at suitable intervals and while locking the three rings together against torsional movement allow the rubber bushing-ring to yield. To supplement the effect of these pins $g'$, tongues $h$ are bolted radially to the outer ring W and slide freely through keepers $h'$ on the sides of the inner ring $W^2$.

With regard to the construction of the chain I would state that its form is such as to keep it in position on the wheels regardless of the relative position of the wheels.

Having thus described my invention, what I claim as new, and desire to secure by Letters Patent, is—

1. In a traction-engine, a truck consisting of pairs of sprocket-wheels connected by endless track chains or belts, one set of wheels having their journals spring-seated in both vertical and horizontal direction substantially as described.

2. In a traction-engine, a truck consisting of pairs of sprocket-wheels connected by endless track chains or belts, one set of wheels having their journals arranged in boxes having springs both in front and rear of said box, and guiding-frames for accommodating a slight forward and backward movement of said journals substantially as described.

3. In a traction-engine, a truck consisting of pairs of sprocket-wheels connected by endless track chains or belts, journal-boxes for said wheels made yielding in horizontal direction, said journal-boxes having vertical pivotal lugs, and a slotted guiding-frame for the same to accommodate the oblique angular position of the wheel-axes substantially as described.

4. In a traction-engine, the combination of sprocket-wheels with endless track-chains coupling them in pairs, the wheel-axle $b$ with horizontally-adjustable box $d'$, the springs $c\ c$ arranged on opposite sides of the same, a yoke $d$ inclosing said box and springs, the hangers D D receiving the yoke, and the spiral springs and guide-rods $e f$ arranged above the yoke substantially as and for the purpose described.

5. In a traction-engine, a track-chain composed of links having bearing-faces in the middle, and inwardly and upwardly turned ends lapped past each other and jointed together at the ends to keep the joints away from contact with the ground and to prevent openings between the bearing-faces of the links as described.

6. In a traction-engine, a track-chain composed of links each formed of two side bars with blocks $a'$ of yielding material bolted between them and forming the grappling-surfaces for the sprocket-teeth and also the ground-bearings for the chain as described.

7. A chain formed with elastic bearing-blocks substantially as described.

8. A chain having elastic bearing-blocks combined with sprocket-wheels having teeth fitting against said elastic bearings substantially as described.

9. A sprocket-wheel for a traction-engine, consisting of a continuous outer metal ring having sprocket-teeth formed thereon, an inner ring of metal, an interposed ring of elastic material, and radial pins fixed rigidly in the middle of one of the metal rings and protruding loosely through the body portion of the elastic ring and the other metal ring and locking the same together against torsional movement substantially as described.

10. A sprocket-wheel for a traction-engine consisting of a continuous outer metallic ring having sprocket-teeth formed thereon, an inner metallic ring, and an interposed bushing-ring of elastic material, radial pins fixed rigidly in one of the metallic rings and protruding loosely through the body portion of the elastic ring and the other metal ring, and external guiding-tongues arranged radially on the sides of one of the metal rings, and keepers receiving said tongues and located on the sides of the other metal ring substantially as and for the purpose described.

In testimony whereof I have signed my name to this specification in the presence of two subscribing witnesses.

DANIEL CHARLES CAWLEY.

Witnesses:
  HAROLD W. WATKINS,
  NORMAN R. MCAFEE.